(12) United States Patent
Schmidt et al.

(10) Patent No.: US 7,674,387 B2
(45) Date of Patent: Mar. 9, 2010

(54) OIL FILTRATION SYSTEM

(75) Inventors: Paul Wayne Schmidt, Washington, IL (US); Robert Murray Boatman, Libertyville, IL (US)

(73) Assignee: Komatsu America Corp., Rolling Meadows, IL (US)

( * ) Notice: Subject to any disclaimer, the term of this patent is extended or adjusted under 35 U.S.C. 154(b) by 0 days.

(21) Appl. No.: 11/007,165

(22) Filed: Dec. 9, 2004

(65) Prior Publication Data
US 2005/0126968 A1 Jun. 16, 2005

Related U.S. Application Data

(60) Provisional application No. 60/528,185, filed on Dec. 10, 2003.

(51) Int. Cl.
*B01D 17/02* (2006.01)
*F01M 11/03* (2006.01)
(52) U.S. Cl. .................. 210/774; 210/167.07
(58) Field of Classification Search ................ 210/767, 210/774, 168, 175, 180, 181, 252, 259, 416.1, 210/416.5, 167.01, 167.02, 167.04, 167.06, 210/167.07

See application file for complete search history.

(56) References Cited

U.S. PATENT DOCUMENTS

| 2,082,847 | A |   | 5/1937 | Petty |
| 2,249,701 | A | * | 7/1941 | Clayton ................ 554/195 |
| 2,288,441 | A | * | 6/1942 | Ewing ................. 554/193 |
| 2,324,763 | A |   | 7/1943 | Carruthers |

(Continued)

FOREIGN PATENT DOCUMENTS

JP          6-71248      *    3/1994

OTHER PUBLICATIONS

Sharon Dory et al., "Contamination Control Program Substantially Decreases Mine's Mobile Equipment Costs", Practicing Oil Analysis, vol. Jul.-Aug. 2003, pp. 1-9.

(Continued)

*Primary Examiner*—Fred Prince
(74) *Attorney, Agent, or Firm*—Wenderoth, Lind & Ponack, L.L.P.

(57) ABSTRACT

An oil filtration system includes three separate tanks. A first of these tanks is to receive oil from a wheel motor of the mining or construction vehicle. A second of these tanks is to receive the oil from the first tank after the oil in the first tank has been sufficiently heated so as to remove moisture therefrom. And, a third of these tanks is to receive the oil from the second tank after the oil has been sufficiently filtered so as to remove particles and debris therefrom. The third tank can hold the filtered oil therein until it is ready to be supplied back to the wheel motor.

21 Claims, 2 Drawing Sheets

U.S. PATENT DOCUMENTS

| | | | |
|---|---|---|---|
| 2,665,772 A | | 1/1954 | Geer et al. |
| 2,895,883 A | | 9/1959 | Hobson |
| 3,954,611 A | * | 5/1976 | Reedy .................. 210/695 |
| 4,089,662 A | * | 5/1978 | Williams ................ 96/160 |
| 4,148,729 A | * | 4/1979 | Howard ................. 210/104 |
| 4,217,221 A | | 8/1980 | Masso |
| 4,515,684 A | * | 5/1985 | Brown .................. 208/180 |
| 4,789,461 A | | 12/1988 | Clare et al. |
| 4,830,745 A | | 5/1989 | van der Meulen |
| 4,846,967 A | * | 7/1989 | McGehee ............... 210/181 |
| 4,971,704 A | | 11/1990 | Johnson, Sr. |
| 5,059,332 A | * | 10/1991 | Satoh .................... 210/771 |
| 5,075,044 A | * | 12/1991 | Augem .................... 588/9 |
| 5,171,455 A | * | 12/1992 | Wang et al. ............. 210/744 |
| 5,413,716 A | | 5/1995 | Osborne |
| 5,510,023 A | | 4/1996 | Taylor |
| 5,851,386 A | * | 12/1998 | Paul ..................... 210/183 |
| 5,900,155 A | | 5/1999 | Bedi |
| 6,328,132 B1 | | 12/2001 | Zager |
| 6,620,327 B2 | | 9/2003 | Haddock |
| 2005/0241677 A1 | * | 11/2005 | Nealon ................. 134/22.1 |

OTHER PUBLICATIONS

Sharon Dory et al., "Magnetic Plug Inspection Enhances Condition-Based Maintenance", Practicing Oil Analysis, Vo Sep.-Oct. 2003, pp. 14 and 16-24.

International Search Report issued Dec. 9, 2005 in the International (PCT) Application No. PCT/US2004/41156 which corresponds to the present application.

Peruvian Office Action dated Feb. 8, 2008 (and an English translation thereof) in Peruvian Application No. 001227:2004, which is a foreign counterpart of the present application.

Canadian Office Action dated Jun. 13, 2007 in Canadian Application No. 2,548,979, which is a foreign counterpart of the present application.

* cited by examiner

OIL FILTRATION SYSTEM

This application claims the benefit of U.S. Provisional Application No. 60/528,185, filed Dec. 10, 2003.

BACKGROUND OF THE INVENTION

1. Field of the Invention

The instant invention pertains to an oil filtration system that is to filter oil supplied from a mining or construction vehicle. To prolong life of components of the vehicle and to limit downtime of the vehicle in a cost effective manner, oil used in conjunction with these components is filtered, by the oil filtration system, for re-use with the vehicle.

2. Description of Related Art

A conventional oil filtration system for filtering oil used in a wheel motor is shown in FIG. 1. As shown in FIG. 1, oil is removed from wheel motor 51 through lines 52 and 53, passes through oil tank 54 in which the oil is heated. The oil then passes through a filter 55 and back into the wheel motor 51 through supply line 56. This conventional oil filtration system suffers from a drawback in that the wheel itself forms part of a circuit through which the oil is passed, such that the vehicle to which this wheel belongs cannot be operated until the oil has been sufficiently filtered. Thus, vehicle downtime associated with the conventional oil filtration system is great.

OBJECT OF THE INVENTION

An object of the invention is to provide an oil filtration system that limits downtime associated with mining or construction vehicles by having a wheel from which oil is to be removed not form part of an oil filtration circuit.

To meet this object, the oil filtration system includes three separate tanks. A first of these tanks is to receive oil from a wheel motor of the mining or construction vehicle. A second of these tanks is to receive the oil from the first tank after the oil in the first tank has been sufficiently heated so as to remove moisture therefrom. And, a third of these tanks is to receive the oil from the second tank after the oil has been sufficiently filtered so as to remove particles and debris therefrom. The third tank can hold the filtered oil therein until it is ready to be supplied back to the wheel motor.

Accordingly, because all of the oil is removed from the wheel motor and then passed through a filtration circuit, while this oil is being filtered new oil can be supplied into the wheel motor such that downtime of the mining or construction vehicle is limited to a minimum.

SUMMARY OF THE INVENTION

Provided is an oil filtration system that comprises a first tank, a second tank and a third tank in fluid communication with one another. A heater is provided in the first tank, and a filter is provided between the second tank and the third tank. A first pump is proved for pumping oil from the first tank to the second tank, and a second pump is provided for pumping oil from the second tank through the first filter and to the third tank. A first valve is positioned downstream of the first filter an upstream of the third tank such that when the first valve is in an open positioned and oil is pumped by the second pump, the oil flows through the first filter and then to the third tank, and when the first valve is in a closed position and oil is pumped by the second pump, the oil is re-circulated through the first filter.

A particle counter is provided for determining an amount of particles in the oil after the oil has passed through the first filter. A second valve is positioned downstream of the first filter and upstream of the particle counter such that when the second valve is in an open position and the first valve is in a closed positioned, and oil is pumped by the second pump, the oil flows through the first filter and to the particle counter. Heaters can also be provided in each of the second tank and third tank.

Additionally, a second filter can be provided between the second tank and the third tank. Associated with this second filter is a third pump for pumping oil from the second tank through the second filter and to the third tank. A third valve is positioned downstream of the second filter and upstream of the third tank such that when the third valve is in an open position and oil is pumped by the third pump, the oil flows through the second filter and then to the third tank, and when the third valve is in a closed position and oil is pumped by the third pump the oil is re-circulated through the second filter. Oil passing through the second filter can also be passed to the particle counter by providing a fourth valve that is positioned downstream of the second filter and upstream of the particle counter such that when the fourth valve is in an open positioned and the third valve is in a closed position, and oil is pumped by the third pump, the oil flows through the second filter and to particle counter.

The second filter can have a greater filtration capacity than that of the first filter, and the second pump and the third pump can be operated in series so as to first pump oil from the second tank through the first filter and then pump the oil through the second filter. Alternatively, the second filter and the third filter can have equal filtration capacities, and the second pump and the third pump can be operated in parallel so as to simultaneously pump oil from the second tank through the first filter and the second filter.

To remove oil from the wheel motor, a first conduit is provided which is connectable to the wheel driven by the wheel motor, and to supply filtered oil back into the wheel motor, a second conduit is provided which is also connectable to the wheel.

When 680 viscosity oil is to be filtered by the system, the oil is heated in the first tank to a temperature of 130° F. prior to being passed through the remainder of the oil filtration system. When oil to be treated is 1,000 viscosity oil, this oil is heated in the first tank to a temperature of 160° F. prior to being passed through the remainder of the oil filtration system. In either case, the oil is continually passed through the filter(s) until the oil corresponds to ISO specification of 18/13.

DETAILED DESCRIPTION OF THE PREFERRED EMBODIMENTS

Figure 1:
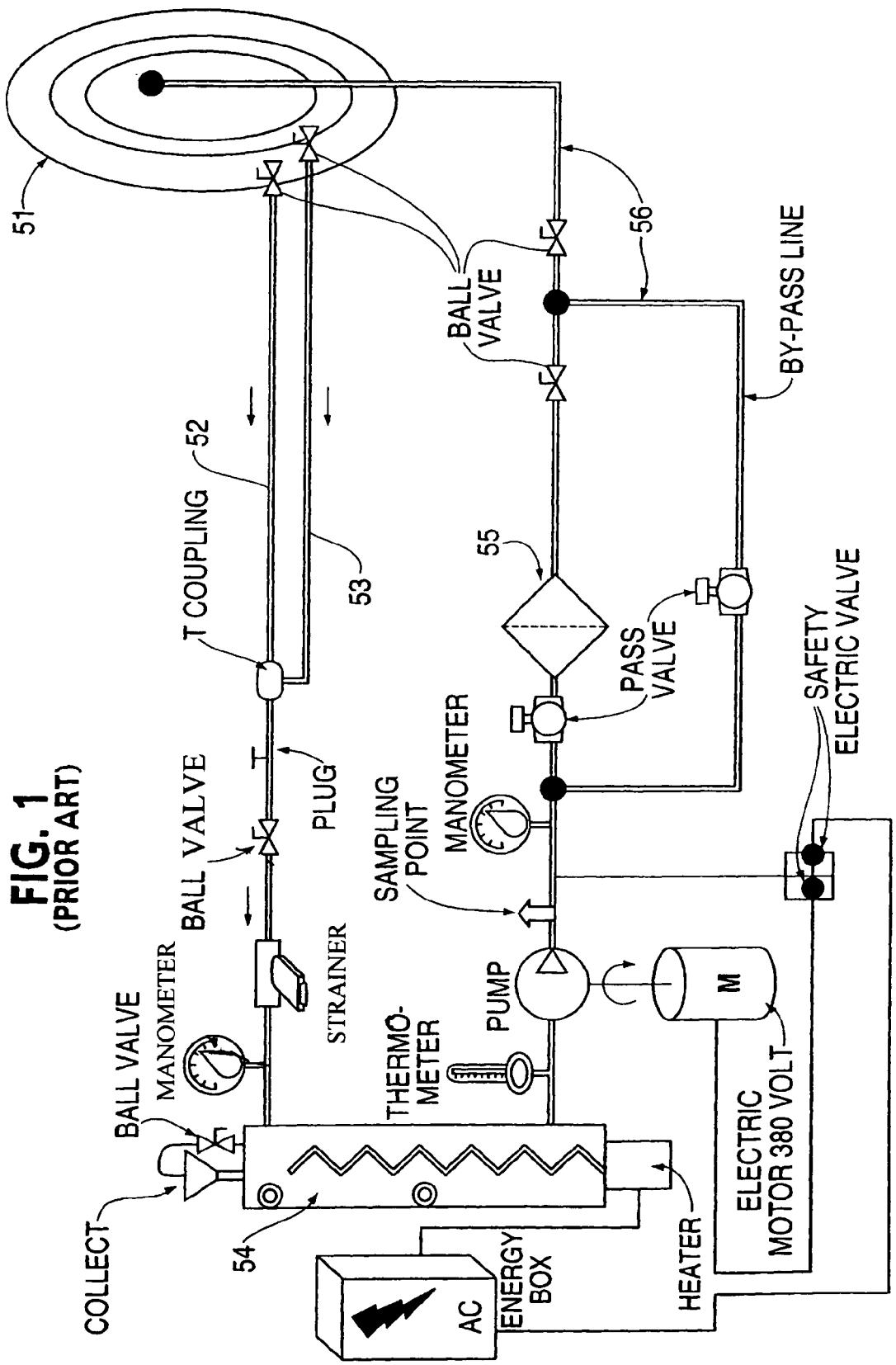
FIG. 1 shows a conventional oil filtration system used in connection with a wheel motor.
Figure 2:
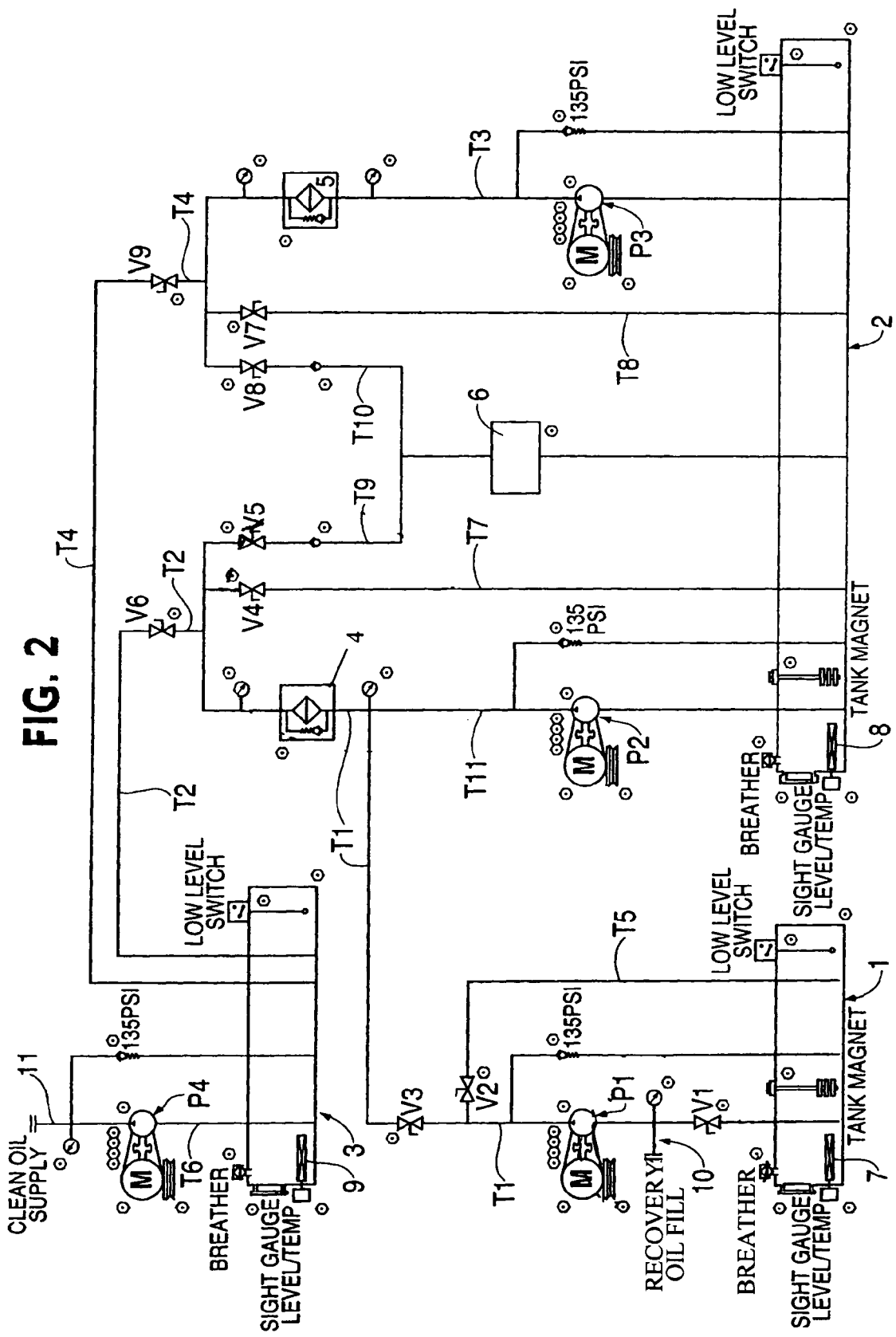
FIG. 2 is a schematic diagram showing an oil filtration system of the invention.

As shown in FIG. 1, the oil filtration system comprises a dirty oil tank 1, a circulation oil tank 2 and a clean oil tank 3. The dirty oil tank 1 is designed to hold up to fifty gallons of oil and is in fluid communication with the circulation oil tank 2 via conduit sections T1, T7. To control the flow of oil from the dirty oil tank 1 to the circulation oil tank 2, provided in the conduit section T1 are valves V1, V3 and pump P1, and provided in conduit section T7 is valve V4. Associated with pump P1 is a pressure gauge to measure a pressure of the oil pumped by this pump.

The circulation oil tank 2 is in fluid communication with the clean oil tank 3 via conduit sections T11, T1, T2 and also via conduit sections T3, T4. To control the flow of oil from the circulation oil tank 2 to the clean oil tank 3 via conduit sections T11, T1, T2 provided in the conduit section T1 is pump P2 and provided in the conduit section T2 is valve V6. And, to control the flow of oil from the circulation oil tank 2 to the clean oil tank 3 via conduit sections T3, T4 provided in the conduit section T3 is pump P3 and provided in the conduit section T4 is valve V9. Associated with pumps P2 and P3 are respective pressure gauges to measure a pressure of the oil pumped by these pumps. Even though conduit sections T11, T1, T2 and conduit sections T3, T4 are shown for fluidly interconnecting the circulation oil tank 2 and the clean oil tank 3, only conduit sections T11, T1, T2, along with valve V6 and pump P2, are absolutely necessary for fluidly interconnecting the circulation oil tank 2 with the clean oil tank 3. To place the dirty oil tank 1 in fluid communication with a vehicle or other apparatus from which oil is to be received so as to be filtered, there is provided conduit section T5 and valve V2 in this conduit section. A fill port 10 is associated with conduit section T1, to which fill port a recovery hose is to be connected, and through which recovery hose and fill port oil is to be supplied to the dirty oil tank 1 via conduit section T5. A pressure gauge, e.g. a vacuum gauge, is provided to measure pressure within the fill port 10. As will be described subsequently, valves V1, V2 and V3 are operated so as to allow oil to either flow from the vehicle or other apparatus into the dirty oil tank 1, or flow from the dirty oil tank 1 into the circulation oil tank 2.

To place the clean oil tank 3 in fluid communication with a vehicle or other apparatus to which filtered oil is to be supplied, there is provided conduit section T6 and pump P4 in this conduit section. Associated with pump P4 is a pressure gauge to measure a pressure of the oil pumped by this pump. A supply port 11 is associated with conduit section T6, to which supply port a recovery hose is to be connected, and through which supply port and recovery hose oil is to flow from the clean supply tank 3 to the vehicle or other apparatus.

Within the dirty oil tank 1 there is provided a heater 7, which is to heat oil in the dirty oil tank 1 so as to remove moisture therefrom and so as to ensure that a viscosity of the oil is sufficiently low such that the oil can be adequately and efficiently pumped from this tank. Within circulation oil tank 2 a heater 8 is provided, and within clean oil tank 3 a heater 9 is provided, which heaters are to heat oil in these tanks to ensure that a viscosity of oil in these tanks is sufficiently low for allowing the oil to be adequately and efficiently pumped from these tanks.

Each of heaters 7, 8 and 9 includes an adjustable thermostat within a housing. When an oil temperature within any of the tanks 1, 2 or 3 is below a point set by the thermostat of its respective heater, then the heater will automatically be activated. Similarly, when an oil temperature within any of the tanks 1, 2 or 3 is approximately 5 F above the point set by the thermostat of its respective heater, then the heater will automatically be de-activated.

Before oil is pumped from the circulation tank 2 to the clean oil tank 3, the oil is passed through a filter 4 so as to remove particles and contaminants from the oil. The oil is passed through filter 4 as many times as is necessary to sufficiently remove the particles and contaminants therefrom. The filter 4 is in conduit section T1, which conduit section is in fluid communication with the circulation oil tank 2 via conduit section T11, and is also in fluid communication with conduit section T7. Within conduit T7 is provided valve V4. Operation of valve V4 allows the oil to be either re-circulated through the filter 4, or supplied to the clean oil tank 3.

In a similar manner, oil in the circulation tank 2 can also be passed through a second filter 5. Filter 5 is in conduit section T3, and conduit section T3 is in fluid communication with the circulation oil tank 2 and conduit section T8. A valve V7 is in conduit section T8 so as to enable the oil to be re-circulated through filter 5 or to be conveyed from the circulation oil tank 2 to the clean oil tank 3. Filters 4 and 5 can be used in series or parallel relative to one another. When used in series, filter 5 is designed to remove smaller particles than those removed by filter 4, and when used in parallel, filters 4 and 5 have the same filtration capacity. The oil filtration system can operate with only filter 4, such that filter 5 and the conduit sections, valves and pump associated therewith can be omitted.

To periodically check whether oil has been sufficiently filtered by filters 4 and 5, a particle counter 6 is provided, which particle counter is an HIAC model PM 4000 manufactured by Pacific Scientific Instruments. The particle counter 6 is in fluid communication with pump 4 via conduit section T9, and is in fluid communication with pump 5 via conduit section T10. A valve V5 is in conduit section T9, which valve is operated to allow a sample of oil to be removed from conduit section T1 after passing through filter 4. In a similar manner, a valve V8 is in conduit section T10, which valve is operated to allow a sample of oil to removed from conduit section T3 after passing through filter 5.

The valves, pumps and heaters are electrically controlled via a control panel (not shown).

Operation

Using only Filter 4

Operation of the oil filtration system will now be described with reference to 680 Viscosity oil.

One end of a recovery hose is connected to a wheel drain of a vehicle, and another end of the recovery hose is connected to the fill port 10. With valves V1 and V3 closed, and valve V2 opened, pump P1 is activated such that oil is pumped from the wheel drain and into the dirty oil tank 1 via conduit T5. At this time, a reading from the vacuum gauge associated with the fill port 10 is taken, and if this reading indicates excessive pressure (e.g. more than 25 inches of water), then either the oil needs to be heated to reduce its viscosity or a shorter recovery hose is needed. The recovery hose preferably is not more than eight feet in length. When flow of the oil into the dirty oil tank 1 begins, heater 7 is activated to ensure that the oil is heated to at least 130° F. so as to remove moisture from the oil as well as to ensure that viscosity of the oil is sufficiently low to allow the oil to be efficiently pumped from the dirty oil tank 1. Once the oil has been pumped into the dirty oil tank 1, pump P1 is de-activated.

After the oil has been pumped into the dirty oil tank 1 and is at a temperature of at least 130° F., with sufficient moisture being removed from the oil, the heater 7 is de-activated and valves V1, V3 and V4 are opened while valves V2, V5 and V6 are closed. Then, pump P1 is activated so as to pump the oil from the dirty oil tank 1 to the circulation oil tank 2 via conduit sections T1 and T7. At this time, a reading from the pressure gauge associated with pump P1 is taken, and if this reading indicates excessive pressure (e.g. more than 140 psi), then the oil needs to be further heated so as to reduce its viscosity. When the oil begins to flow into the circulation oil tank 2, heater 8 is activated so as to maintain the oil in the circulation oil tank 2 at a temperature of at least 130° F. so as maintain the oil at a desired viscosity.

After the oil has been received within circulation oil tank 2 and when the oil is only to be passed through filter 4, valves V3, V5 and V7 are closed while valve V4 remains opened. When the oil in circulation oil tank 2 is at a temperature of at least 130° F., pump P2 is activated such that the oil passes through filter 4 at a flow rate of thirty five gallons per minute. At this time, a reading from the pressure gauge associated with pump P2 is taken, and if this reading indicates excessive pressure (e.g. more than 140 psi), then the oil needs to be further heated so as to reduce its viscosity. Also at this time, or at a subsequent time, a reading of a pressure differential across filter 4 is taken, and a pressure differential of greater than 30 psi at an oil temperature of 130° F. is an indication that a filter element of the filter must be changed.

In order to determine when the oil has been sufficiently filtered by filter 4, a sample of the oil is taken by opening valve V5 and closing valve V4 such that a sample of oil flows to the particle counter 6 via conduit section T9. If a reading of the particle counter 6 indicates that the oil has not been sufficiently filtered, then valve V5 is closed while valve V4 is opened, and the oil is re-circulated through filter 4 via conduit sections T7, T11. If a reading of the particle counter 6 indicates that the oil has been sufficiently filtered, i.e. a reading corresponding to ISO Specification of 18/13, then pump P2 is de-activated and the oil is ready to be conveyed to the clean oil tank 3.

To convey the oil from the circulation oil tank 2 to the clean oil tank 3, the heater 8 is de-activated, and valve V6 is opened while the valves V4 and V5 are closed, such that the oil is pumped by pump P2 from the circulation oil tank 2 to the clean oil tank 3 via conduit sections T11, T1, T2.

Upon flowing of oil into the clean oil tank 3, heater 9 is activated to ensure that the oil in the clean oil tank is maintained at a temperature of at least 130° F. After the oil has been pumped into clean oil tank 3 and is at a temperature of at least 130° F., the oil is ready to be transferred from the clean oil tank 3 back to the wheel of the vehicle.

To convey the oil from the clean oil tank 3 to the wheel, the heater 9 is de-activated, a supply hose is used to interconnect the supply port 11 and the wheel, and pump P4 is activated. Pump P4 automatically de-activates after the oil has been pumped from the clean oil tank 3 back to the wheel and the clean oil tank is nearly empty. At this time, a reading from the pressure gauge associated with pump P4 is taken, and if this reading indicates excessive pressure (e.g. more than 140 psi), then the oil needs to be further heated so as to reduce its viscosity.

Using Filter 5 in Series with Filter 4

In addition to filtering the oil via filter 4, the oil in the circulation oil tank 2 can also be filtered via filter 5 after having been filtered by filter 4. In this case, filter 5 has a greater filtration capacity than does filter 4, e.g. filter 4 is designed to remove all particles having a particle size of at least 10 microns while filter 5 is designed to remove all particles having a particle size of at least 6 microns. After the oil has been received within circulation oil tank 2 and filtered by filter 4, valves V4 and V8 are closed while valve V7 is opened, and pump P2 is de-activated. When the oil in circulation oil tank 2 is at a temperature of at least 130° F., pump P3 is activated such that the oil passes through filter 5. At this time, a reading from the pressure gauge associated with pump P3 is taken, and if this reading indicates excessive pressure (e.g. more than 140 psi), then the oil needs to be further heated so as to reduce its viscosity. Also at this time, or at a subsequent time, a reading of a pressure differential across filter 5 is taken, and a pressure differential of greater than 30 psi at an oil temperature of 130° F. is an indication that a filter element of the filter must be changed.

In order to determine when the oil has been sufficiently filtered by filter 5 a sample of the oil is taken by opening valve V8 and closing valve V7 such that a sample of oil flows to the particle counter 6 via conduit section T10. If a reading of the particle counter 6 indicates that the oil has not been sufficiently filtered, then valve V8 is closed while valve V7 is opened, and the oil is re-circulated through filter 5 via conduit sections T3 and T8. If a reading of the particle counter 6 indicates that the oil has been sufficiently filtered, i.e. a reading corresponding to ISO Specification of 18/13, then pump P3 is de-activated and the oil is ready to be conveyed to the clean oil tank 3.

To convey the oil from the circulation oil tank 2 to the clean oil tank 3, the heater 8 is de-activated, and valve V9 is opened while the valves V7 and V8 are closed, such that the oil is pumped by pump P3 from the circulation oil tank 2 to the clean oil tank 3 via conduit sections T3, T4.

Upon flowing of oil into the clean oil tank 3, heater 9 is activated to ensure that the oil in the clean oil tank is maintained at a temperature of at least 130° F. After the oil has been pumped into clean oil tank 3 and is at a temperature of at least 130° F., the oil is ready to be transferred from the clean oil tank 3 back to the wheel of the vehicle.

To convey the oil from the clean oil tank 3 to the wheel, the heater 9 is de-activated, a supply hose is used to interconnect the supply port 11 and the wheel, and pump P4 is activated. Pump P4 automatically de-activates after the oil has been pumped from the clean oil tank 3 back to the wheel and the clean oil tank is nearly empty. At this time, a reading from the pressure gauge associated with pump P4 is taken, and if this reading indicates excessive pressure (e.g. more than 140 psi), then the oil needs to be further heated so as to reduce its viscosity.

Using Filter 5 in Parallel with Filter 4

Filters 4 and 5 can also be used simultaneously to filter oil pumped from the circulation oil tank 2. In this case, filters 4 and 5 are of the same filtration capacity, e.g. both being designed to remove particles having a particle size of at least 10 microns. To operate filters 4 and 5 in parallel, after the oil has been received within circulation oil tank 2, valves V3, V5, V6, V8 and V9 are closed while valves V4 and V7 are opened. When the oil in circulation oil tank 2 is at a temperature of at least 130° F., pumps P2 and P3 are activated such that the oil passes through filters 4 and 5 via conduit sections T11 and T3, respectively. At this time, a reading from the pressure gauge associated with pump P3 and a reading from the pressure gauge associated with pump P2 are taken, and if either of these readings indicates excessive pressure (e.g. more than 140 psi), then the oil needs to be further heated so as to reduce its viscosity. Also at this time, or at a subsequent time, a reading of a pressure differential across filter 5 and a reading of a pressure differential across filter 4 is taken, and a pressure differential of greater than 30 psi at an oil temperature of 130° F. is an indication that a filter element of its corresponding filter must be changed.

In order to determine when the oil has been sufficiently filtered by filters 4 and 5, a sample of the oil is taken by opening valves V5 and V8 and closing valves V4 and V7 such that a sample of oil flows to the particle counter 6 via conduit sections T9 and T10. If a reading of the particle counter 6 indicates that the oil has not been sufficiently filtered, then valves V5 and V8 are closed while valves V4 and V7 are opened, and the oil is re-circulated through filter 5 via conduit sections T3 and T8 and through filter 4 via conduit sections T11, T1 and T7. If a reading of the particle counter 6 indicates that the oil has been sufficiently filtered, i.e. a reading corresponding to ISO Specification of 18/13, then pumps P2 and P3 are de-activated and the oil is ready to be conveyed to the clean oil tank 3.

To convey the oil from the circulation oil tank 2 to the clean oil tank 3, the heater 8 is de-activated, and valves V6 and V9 are opened while valves V4, V5, V7 and V8 are closed, such that the oil is pumped by pumps P3 and P2 from the circulation oil tank 2 to the clean oil tank 3 via conduit sections T3, T4 and via conduit sections T11, T1, T2, respectively.

Upon flowing of oil into the clean oil tank 3, heater 9 is activated to ensure that the oil in the clean oil tank is maintained at a temperature of at least 130° F. After the oil has been pumped into clean oil tank 3 and is at a temperature of at least 130° F., the oil is ready to be transferred from the clean oil tank 3 back to the wheel of the vehicle.

To convey the oil from the clean oil tank 3 to the wheel, the heater 9 is de-activated, a supply hose is used to interconnect the supply port 11 and the wheel, and pump P4 is activated. Pump P4 automatically de-activates after the oil has been pumped from the clean oil tank 3 back to the wheel and the clean oil tank is nearly empty. At this time, a reading from the pressure gauge associated with pump P4 is taken, and if this reading indicates excessive pressure (e.g. more than 140 psi), then the oil needs to be further heated so as to reduce its viscosity.

As described above, 680 Viscosity oil is filtered; however, other types of fluid, e.g. engine oil, transmission oil, hydraulic fluid, gear lubrication oil, and the like can be filtered by the filtration system. The specific fluid to be filtered would dictate operating parameters of the system, e.g. temperatures, pressures, flow rates, pressure differentials, filtration capacity, and the like. For example, if a 1000 Viscosity oil were to be filtered, then this oil would be heated by the heaters 7, 8 and 9 to a temperature of 160° F. Additionally, for 1000 Viscosity oil a heated filter system could be employed.

We claim:

1. A method of filtering oil, comprising:
    in a first tank, heating oil to a temperature sufficient to remove moisture therefrom;
    conveying said oil from said first tank into a second tank;
    heating said oil in said second tank with a heater arranged within said second tank until said oil obtains a predetermined temperature; then
    passing said oil from said second tank through a first filter; and then
    conveying said oil into a third tank,
    wherein said heating of said oil in said second tank comprises holding said oil in said second tank while heating said oil such that said oil does not flow from said second tank toward said first filter.

2. The method according to claim 1, wherein
    conveying said oil from said first tank into a second tank comprises pumping said oil, via a first pump, from said first tank into said second tank.

3. The method according to claim 2, wherein
    passing said oil from said second tank through a first filter comprises pumping said oil, via a second pump, from said second tank through said first filter, and
    conveying said oil into a third tank comprises pumping said oil, via said second pump, into said third tank.

4. The method according to claim 3, wherein
    pumping said oil into said third tank comprises pumping said oil into said third tank in response to opening a first valve that is positioned downstream of said first filter and upstream of said third tank.

5. The method according to claim 4, wherein
    pumping said oil from said second tank through said first filter and pumping said oil into said third tank comprises re-circulating said oil through said first filter in response to closing said first valve, without any of said oil being conveyed to said third tank, and then pumping said oil into said third tank.

6. The method according to claim 5, further comprising:
    using a particle counter to determine an amount of particles in said oil after said oil has been pumped through said first filter via said second pump.

7. The method according to claim 6, wherein
    using a particle counter to determine an amount of particles in said oil comprises pumping said oil, via said second pump, to said particle counter in response to closing said first valve and opening a second valve that is positioned downstream of said first filter and upstream of said particle counter.

8. The method according to claim 7, wherein
    holding said oil in said second tank until said oil obtains a predetermined temperature comprises holding said oil in said second tank while heating said oil.

9. The method according to claim 8, further comprising:
    heating said oil in said third tank.

10. The method according to claim 7, further comprising:
    pumping said oil, via a third pump, from said second tank through a second filter; and then
    pumping said oil, via said third pump, into said third tank.

11. The method according to claim 10, wherein
    pumping said oil into said third tank comprises pumping said oil into said third tank in response to opening a third valve that is positioned downstream of said second filter and upstream of said third tank.

12. The method according to claim 11, wherein
    pumping said oil from said second tank through said second filter and pumping said oil into said third tank comprises re-circulating said oil through said second filter in response to closing said third valve, without any of said oil being conveyed to said third tank, and then pumping said oil into said third tank.

13. The method according to claim 12, further comprising:
    using said particle counter to determine an amount of particles in said oil after said oil has been pumped through said second filter via said third pump.

14. The method according to claim 13, wherein
    using said particle counter to determine an amount of particles in said oil after said oil has been pumped through said second filter comprises pumping said oil, via said third pump, to said particle counter in response to closing said third valve and opening a fourth valve that is positioned downstream of said second filter and upstream of said particle counter.

15. The method according to claim 10, wherein said second filter has a greater filtration capacity than that of said first filter, and further comprising:
    after pumping said oil through said first filter via said second pump, pumping said oil through said second filter via said third pump.

16. The method according to claim 10, wherein said second filter has a filtration capacity equal to that of said first filter, and further comprising:
   simultaneously pumping said oil through said first filter via said second pump and pumping said oil through said second filter via said third pump.

17. The method according to claim 1, wherein
   heating oil in a first tank to a temperature sufficient to remove moisture therefrom comprises heating 680 Viscosity oil to 130 F.

18. The method according to claim 17, wherein
   conveying said oil into a third tank comprises conveying said 680 Viscosity oil into said third tank after said oil has been filtered so as to correspond to ISO Specification of 18/13.

19. The method according to claim 1, wherein
   heating oil in a first tank to a temperature sufficient to remove moisture therefrom comprises heating 1000 Viscosity oil to 160 F.

20. The method according to claim 19, wherein
   conveying said oil into a third tank comprises conveying said 1000 Viscosity oil into said third tank after said oil has been filtered so as to correspond to ISO Specification of 18/13.

21. The method according to claim 1, wherein
   conveying said oil into a third tank comprises conveying said oil into said third tank after said oil has been filtered so as to correspond to ISO Specification of 18/13.

* * * * *